US012018516B2

(12) United States Patent
Fishman

(10) Patent No.: US 12,018,516 B2
(45) Date of Patent: Jun. 25, 2024

(54) ELECTRONIC LOCK

(71) Applicant: Delta Cycle Corporation, Randolph, MA (US)

(72) Inventor: Udi Fishman, Los Gatos, CA (US)

(73) Assignee: Delta Cycle Corporation, Randolph, MA (US)

( * ) Notice: Subject to any disclaimer, the term of this patent is extended or adjusted under 35 U.S.C. 154(b) by 282 days.

(21) Appl. No.: 17/363,891

(22) Filed: Jun. 30, 2021

(65) Prior Publication Data

US 2023/0003056 A1 Jan. 5, 2023

(51) Int. Cl.

| | |
|---|---|
| ***E05B 71/00*** | (2006.01) |
| ***E05B 47/00*** | (2006.01) |
| ***G07C 9/00*** | (2020.01) |
| ***H01Q 1/44*** | (2006.01) |

(52) U.S. Cl.

CPC .......... *E05B 71/00* (2013.01); *E05B 47/0001* (2013.01); *G07C 9/00182* (2013.01); *H01Q 1/44* (2013.01); *E05B 2047/0058* (2013.01); *G07C 2009/0019* (2013.01)

(58) Field of Classification Search

CPC ................. E05B 71/00; E05B 47/0001; E05B 2047/0058; E05B 67/003; E05B 73/0005; E05B 73/0029; E05B 47/0607; E05B 67/006; G07C 9/00182; G07C 2009/0019; H01Q 1/44; B62H 3/00; B62H 5/00

See application file for complete search history.

(56) References Cited

U.S. PATENT DOCUMENTS

| | | | |
|---|---|---|---|
| 3,435,642 | A | 4/1969 | Pesco |
| 3,855,825 | A | 12/1974 | Pickard |
| 3,933,015 | A | 1/1976 | Balicki |
| 4,075,878 | A | 2/1978 | Best |
| 4,779,432 | A | 10/1988 | Frontera-Mariani |
| 5,170,650 | A | 12/1992 | Kortenbrede |

(Continued)

FOREIGN PATENT DOCUMENTS

| | | | |
|---|---|---|---|
| CN | 103437607 A | * 12/2013 | |
| CN | 103437607 A | 12/2013 | |

(Continued)

OTHER PUBLICATIONS

Machine translation to English of NL 2000149 C2 (Year: 2023).*

(Continued)

*Primary Examiner* — Kristina R Fulton
*Assistant Examiner* — Emily G. Brown
(74) *Attorney, Agent, or Firm* — Iandiorio Teska & Coleman, LLP

(57) ABSTRACT

A lock includes a cable configured as an antenna, a shackle pin connected to one end of the cable, and a lock body connected to another end of the cable. The lock body includes a channel for the shackle pin, at least one lock member adjacent the channel pivotable from an open position disengaged from the shackle pin to a closed position engaging the shackle pin, a retainer associated with a lock member driven from a released position disengaged from the lock member to an engaged position retaining the lock member in the closed position, and an electrically driven linear actuator driving the retainer to the released position in response to a signal received by a receiver via the antenna.

31 Claims, 12 Drawing Sheets

(56) References Cited

U.S. PATENT DOCUMENTS

| | | | |
|---|---|---|---|
| 5,275,027 A | 1/1994 | Eklof et al. | |
| 5,447,043 A | 9/1995 | Hwang | |
| 5,610,587 A | 3/1997 | Fujiuchi et al. | |
| 5,868,012 A | 2/1999 | Chun-Te et al. | |
| 5,893,283 A | 4/1999 | Evans et al. | |
| 5,992,187 A | 11/1999 | Derman | |
| 6,401,502 B1 | 6/2002 | Yang | |
| 6,419,258 B1 | 7/2002 | Grote | |
| 6,470,718 B1 | 10/2002 | Yang | |
| 6,609,399 B1 | 8/2003 | Daniels | |
| 6,786,297 B1 * | 9/2004 | Menard | G01V 1/201 181/112 |
| 6,997,023 B1 | 2/2006 | Huang | |
| 7,055,656 B2 * | 6/2006 | Drew | F16C 1/26 188/65.1 |
| 7,152,439 B1 | 12/2006 | Chang | |
| 7,401,481 B1 | 7/2008 | Lin | |
| 7,870,764 B2 | 1/2011 | Burmesch | |
| 8,297,087 B1 | 10/2012 | Lin | |
| 9,013,306 B2 | 4/2015 | Koh et al. | |
| 9,187,934 B1 | 11/2015 | Lee | |
| 9,495,820 B1 | 11/2016 | Li | |
| 9,679,429 B2 | 6/2017 | Duncan et al. | |
| 9,797,162 B2 | 10/2017 | Maguire | |
| 9,847,003 B2 | 12/2017 | Sayegh et al. | |
| 10,053,171 B1 | 8/2018 | Young | |
| 2006/0179899 A1 | 8/2006 | Yu | |
| 2009/0031766 A1 * | 2/2009 | Stobbe | B62H 5/003 70/263 |
| 2011/0041569 A1 | 2/2011 | Yu | |
| 2011/0260867 A1 | 10/2011 | McCracken et al. | |
| 2011/0265526 A1 | 11/2011 | Zuraski | |
| 2014/0007628 A1 * | 1/2014 | Beaulieu | E05B 67/003 70/18 |
| 2017/0002586 A1 * | 1/2017 | Lee | E05B 39/00 |
| 2017/0058565 A1 | 3/2017 | Sanchez et al. | |
| 2017/0069154 A1 | 3/2017 | Hilton et al. | |
| 2018/0290702 A1 | 10/2018 | Carlier | |
| 2018/0340351 A1 * | 11/2018 | Harkonen | G01R 31/64 |
| 2019/0106170 A1 | 4/2019 | Hagen et al. | |
| 2019/0300082 A1 * | 10/2019 | Shen | B62H 5/02 |
| 2019/0368234 A1 | 12/2019 | Kolb et al. | |
| 2020/0011085 A1 | 1/2020 | Lai | |
| 2020/0071964 A1 * | 3/2020 | Hill | E05B 63/121 |
| 2021/0131148 A1 | 5/2021 | Schroll | |

FOREIGN PATENT DOCUMENTS

| | | | | |
|---|---|---|---|---|
| DE | 102004019939 A1 | 11/2005 | | |
| DE | 102015005411 A9 * | 11/2016 | | |
| DE | 102015005411 A9 | 11/2016 | | |
| DE | 202018102165 U1 * | 6/2018 | | |
| DE | 202018102165 U1 | 6/2018 | | |
| EP | 0520154 A1 | 12/1992 | | |
| KR | 101298901 B1 * | 8/2013 | | |
| KR | 101298901 B1 | 8/2013 | | |
| NL | 2000149 C2 * | 1/2008 | B62H 5/147 | |
| NL | 2000149 C2 | 1/2008 | | |
| WO | 2013093918 A1 | 6/2013 | | |
| WO | 2015044760 A1 | 4/2015 | | |

OTHER PUBLICATIONS

Espacenet, machine translation to English of DE 202018102165 U1 (Year: 2023).*

Espacenet, machine translation to English of DE 102015005411 A9 (Year: 2023).*

Espacenet, machine translation to English of CN 103437607 A (Year: 2023).*

Written Opinion of the International Application No. PCT/US22/12701, date mailed Apr. 11, 2022, (five (5) pages).

Written Opinion of the International Searching Authority for International Application No. PCT/US2022/040033, dated Nov. 3, 2022, six (6) pages.

* cited by examiner

ELECTRONIC LOCK

FIELD OF THE INVENTION

This invention relates to an electronic lock, for example a cable lock used for bicycles.

BACKGROUND OF THE INVENTION

Electronic locks for bicycles are known. See, for example, U.S. Patent Application No. 2019/0368234 and U.S. Pat. Nos. 5,893,283; 9,679,429; and 9,495,820 all incorporated herein by this reference. Many such locks are activated via a Bluetooth signal transmitted to the lock from a smart device.

SUMMARY OF THE INVENTION

Some cyclists prefer flexible cable locks instead of the rigid hoop style described in published application No. 2019/0368234. On the other hand, known flexible cable locks can be easier to defeat by cutting the cable.

For any electronic lock, the design of the antenna and access to it for the RF signal are design considerations. Adding a port in the lock body for the RF signal to reach the antenna results in an access point for tools or the like which can be used in an effort to defeat the lock.

The size and weight of the lock also increases when the lock is electronically controlled. A battery, a motor, an RF receiver, a controller, and the like are required.

Finally, power management is a concern especially when power is used to both unlock and lock the lock.

Featured in one specific design is a flexible cable electronic lock with a difficult to defeat cable and a spherical lock body which is also difficult to defeat. The lock body has no RF signal port. The lock is made smaller and lighter due to a unique configuration of the mechanism(s) which engages the lock shackle and the retainer which locks the shackle in the lock body. Power is conserved because power is only required to unlock the lock when the retainer is driven for a short time to release the shackle from the lock body. And, the retainer is itself a component of a small solenoid rendering the lock body compact. Also, power for the solenoid is provided by a unique boosting circuit in the lock body.

Featured is a lock comprising a cable configured as an antenna, a shackle pin connected to one end of the cable, and a lock body connected to another end of the cable. The lock body preferably includes a channel for the shackle pin, at least one lock member adjacent the channel pivotable from an open position disengaged from the shackle pin to a closed position engaging the shackle pin, a retainer associated with a lock member driven from a released position disengaged from the lock member to an engaged position retaining the lock member in the closed position, and an electrically driven linear actuator driving the retainer to the released position in response to a signal received by a receiver via the antenna.

The lock body may further include one or more capacitors for powering the electrically driven linear actuator and charged by a battery charged by a charging circuit. The actuator may further include a first spring biasing the retainer in the engaged position. A second spring may be included to bias the lock member in the open position and a third spring in the channel may be included to bias the shackle pin outwards from the channel.

In one preferred example, the lock member includes a striker face which engages the shackle pin to pivot the lock member to the closed position, the shackle pin includes a ledge and the lock member includes a tab seated on the ledge when the lock member is in the closed position. In one version, the retainer is in the form of a shaft and the lock member includes a recess receiving the shaft therein when the shaft engages the lock member in its closed position. Preferably, the recess is aligned with the shaft when the lock member is in the closed position and the recess is not aligned with the shaft when the lock member is in the open position. In one example, the majority of the lock body includes curved surfaces. The lock cable may include a wire rope surrounded by a (e.g., Kevlar®) sheath itself surrounded by interlocking metal beads.

Also featured is a lock comprising a cable configured as an antenna, a shackle pin connected to one end of the cable, and a lock body connected to another end of the cable and including: a channel for the shackle pin, means for retaining the shackle pin in the lock body channel, and an electronically driven linear actuator driving the means for retaining the shackle pin to a released position in response to a signal received by a receiver via the cable. In one version, the means for retaining includes: at least one lock member adjacent the channel pivotable from an open position disengaged from the shackle pin to a closed position engaging the shackle pin, and a retainer associated with a lock member driven by the actuator from a released position disengaged from the lock member to an engaged position retaining the lock member in the closed position. The actuator may further include a first spring biasing the retainer in the engaged position.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1B:
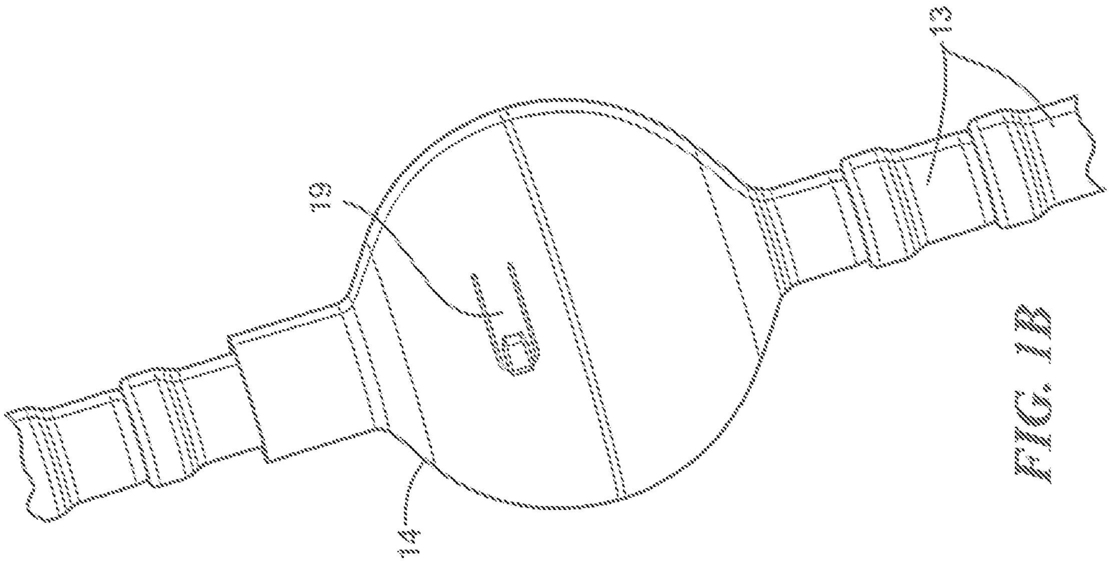
FIGS. 1A-C are schematic three-dimensional views showing an example of a new electronic cable lock.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1A:
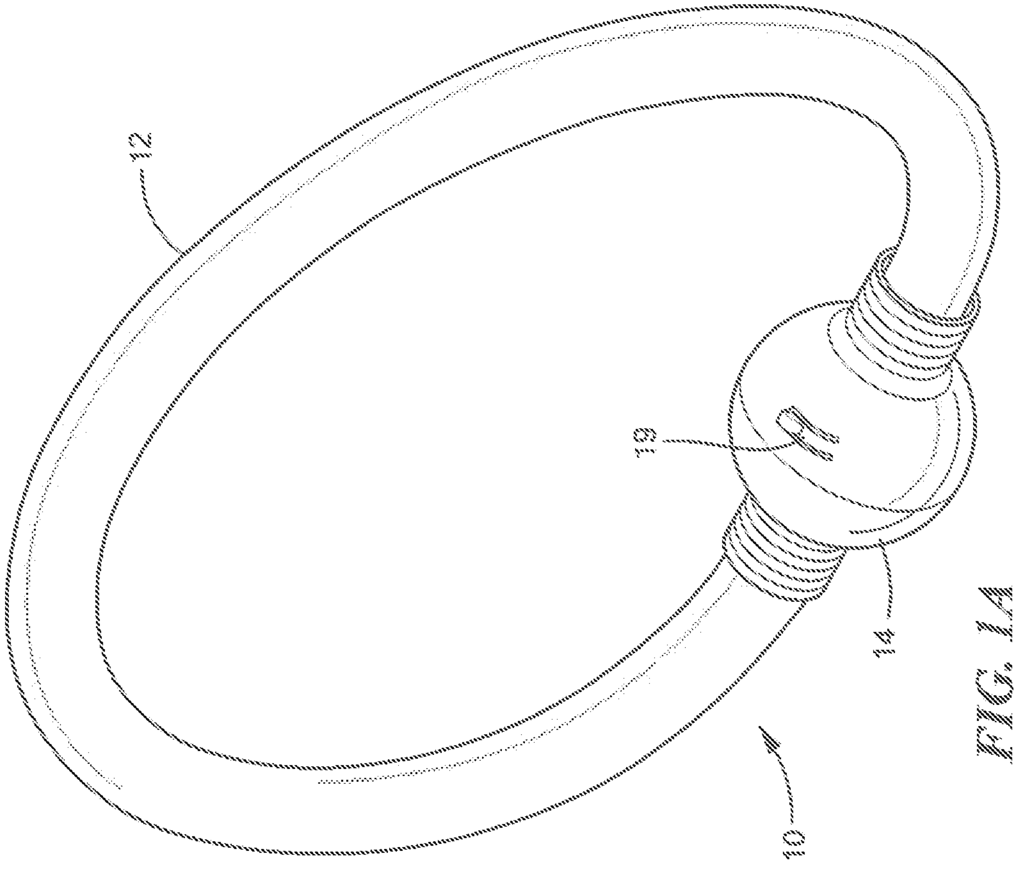
Figure 1C:
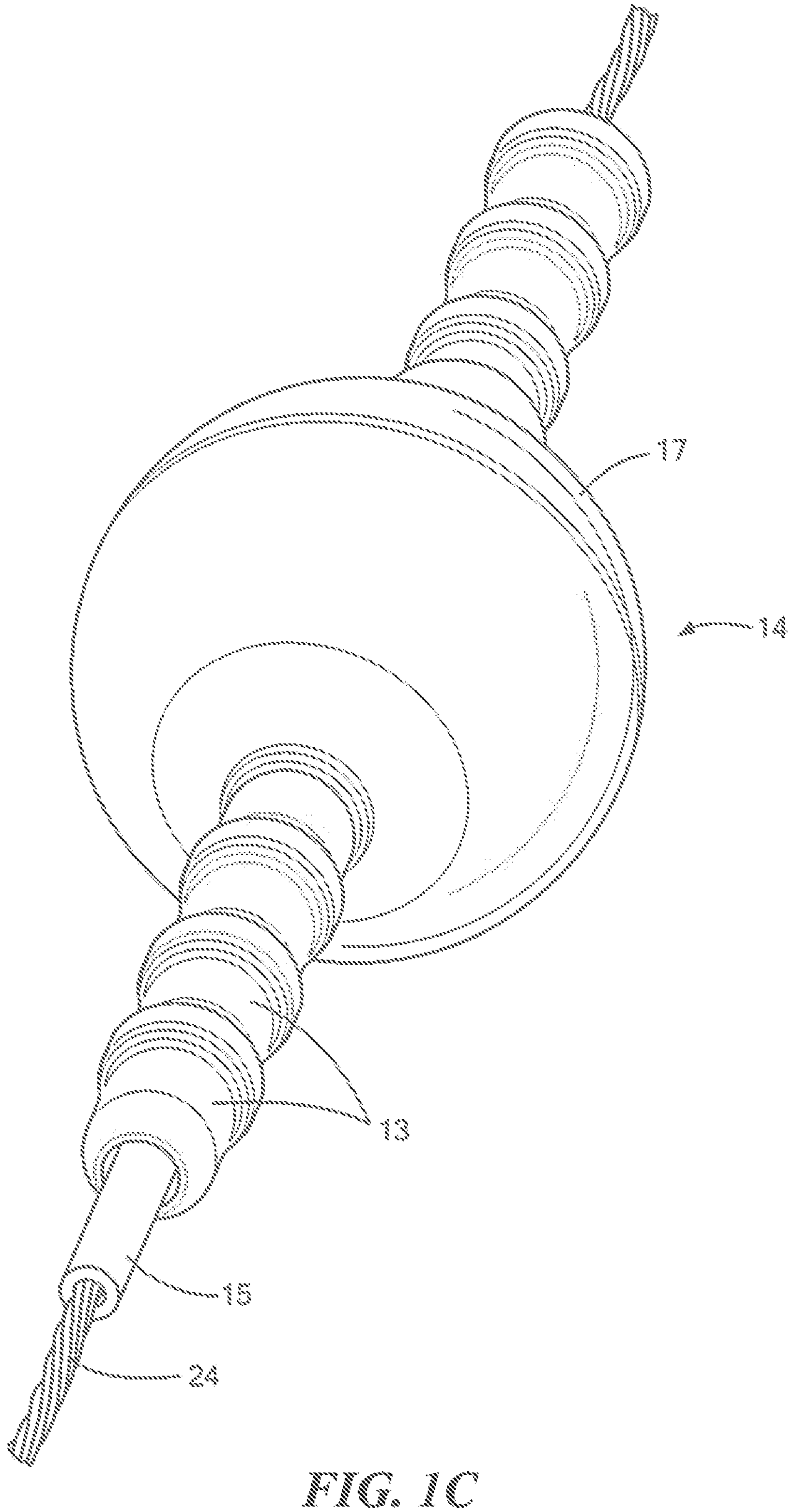

FIG. 1 shows an example of a cable bicycle lock 10 including cable 12 and locking body 14. Cable 12 is preferably constructed according to U.S. Pat. No. 7,055,656 incorporated herein by this reference and it is fairly difficult to defeat due to the use of interlocking metal bead members 13 about internal metal wire rope 24. Interlocking beads 13 (e.g., steel) are difficult to cut and tools cannot be jammed between them. An insulating protective sheath 15 may be disposed between the bead members 13 and the internal wire 24. Insulating flexible sheath 15 may be made of a protective material such as Kevlar®. Sheath 15 is flexible and thus is difficult to cut. Lock body 14 itself is approximately spherical in construction with no or few easily gripped surfaces as shown and includes a metal shell 17 with only a single small access 19 for USB charge port 23 (FIG. 5) receiving a USB charging cable in order to charge the internal battery 21. The mostly spherical shape of the lock body makes it difficult to grasp with a cutter or gripper tool and difficult to cut or damage. Egg or other shapes can be employed such that the majority of the lock body includes curved surfaces and/or is devoid or mostly devoid of easily gripped corners or surfaces. The lock body may include two halves press fit together and retained via a blind dowel pin. Protective (e.g., silicone) sheath 17, FIG. 1A, may be disposed about the interlocking beads to protect the bicycle. Lock body 19 may also include a protective coating such as silicone.

Figure 2:
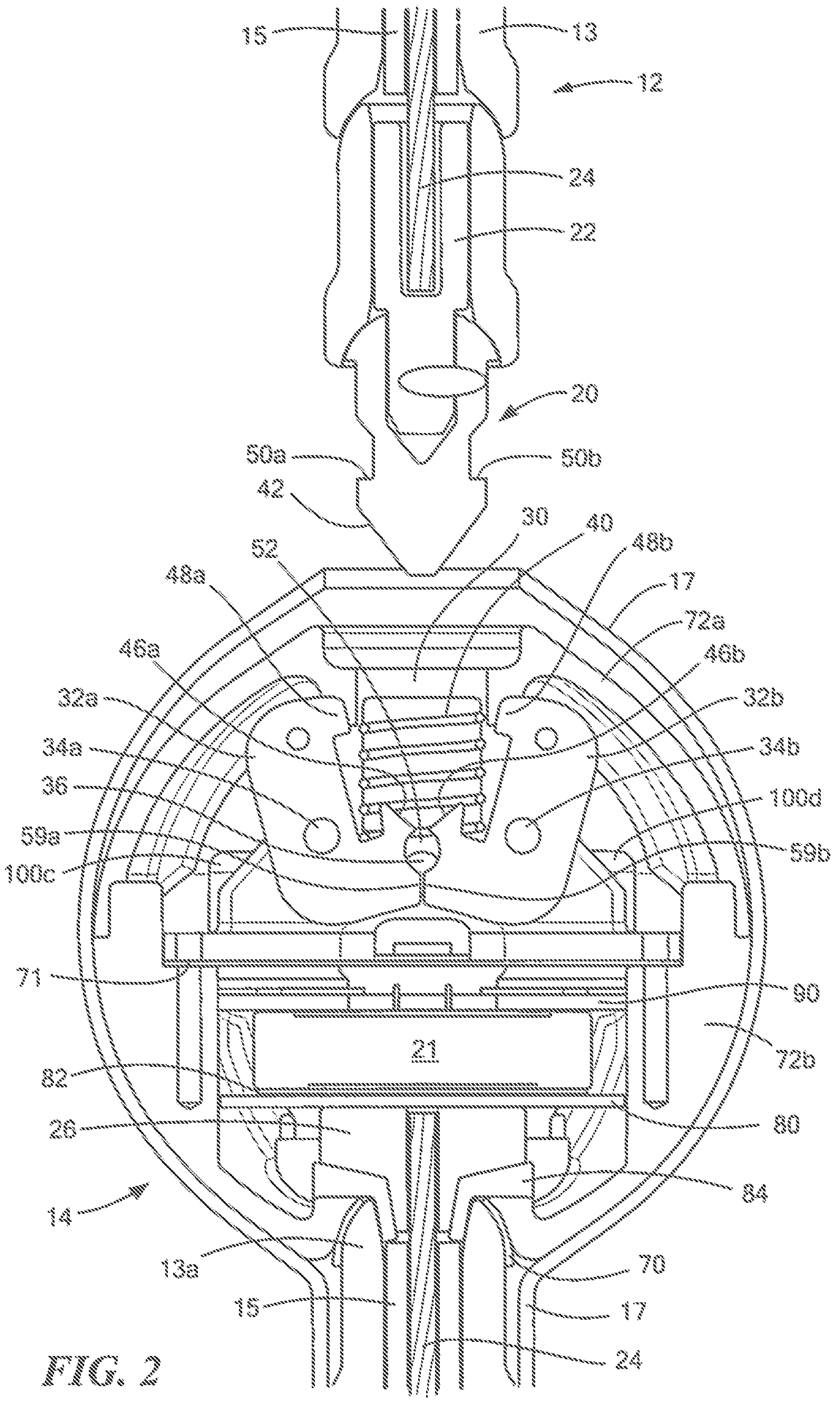
FIG. 2 is a schematic cross-sectional view showing the lock of FIG. 1 in its unlocked position.
Figure 3:
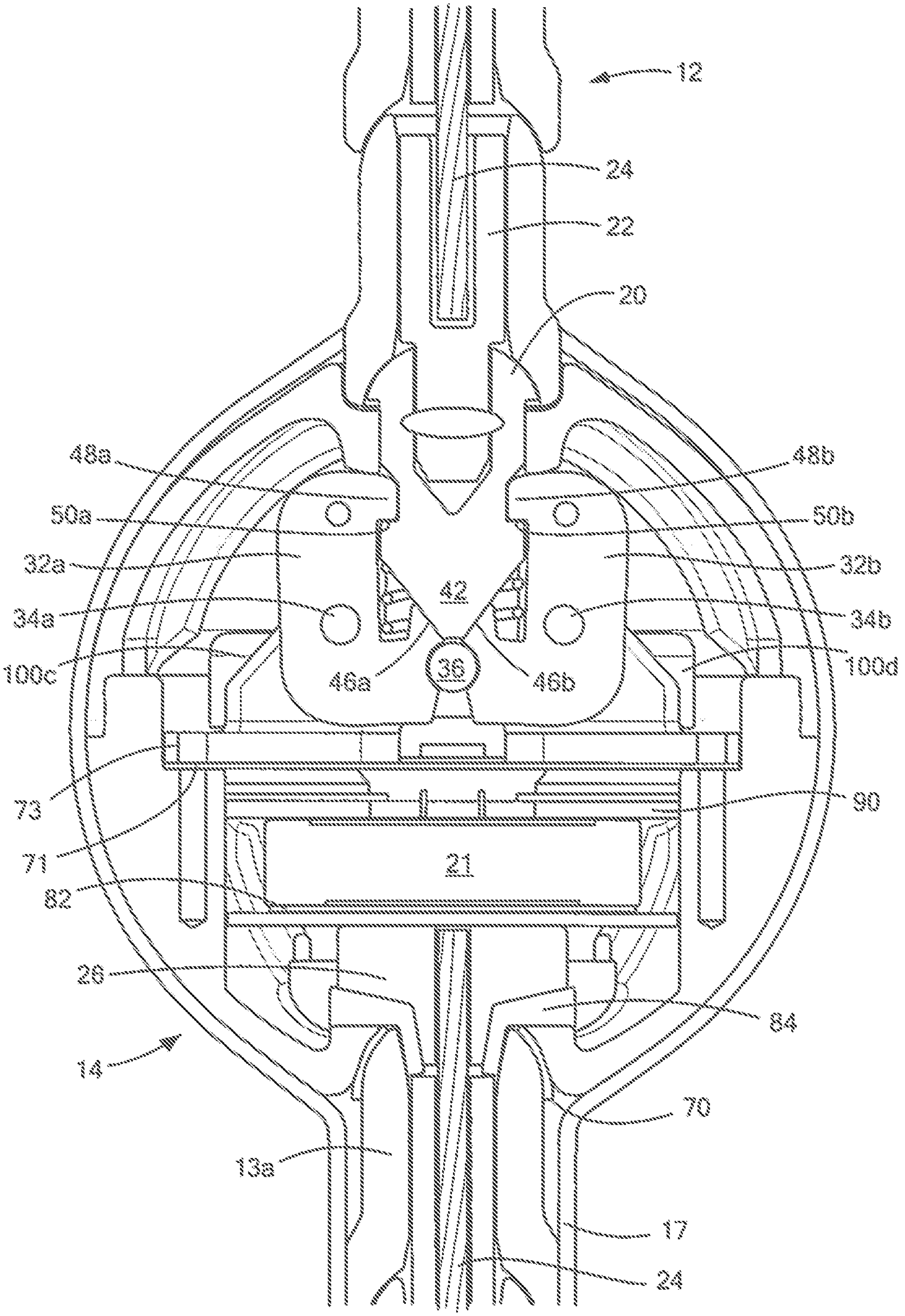
FIG. 3 is a cross-sectional view showing the lock of FIG. 1 in its locked configuration.

Shackle pin 20, FIGS. 2 and 3 is fixed to one end of cable 12 and lock body 14 is fixed to the other end of cable 12. Shackle pin 20 may be fixed relative to member 22 which is secured to interior wire rope 24 of cable 12. Lock body 14 includes cable end 26 fixed therein. Channel 30 extends into spherical lock body 14 receiving shackle pin 20 therein. Further included are means for retaining the shackle pin 20 within channel 30. In one example, such means includes, inter alia, one or more lock bodies and an associated retainer. For example, lock members 32*a* and 32*b* are disposed adjacent channel 30 and pivot about posts 34*a*, 34*b*, respectively, between an open (unlocked) position, FIG. 2 disengaged from shackle pin 20 and a closed (locked) position, FIG. 3 engaging the shackle pin. A retainer, here in the form of steel shaft 36, is driven from a released (unlocked) position (FIG. 2) disengaged from the lock members 32*a*, 32*b* to an engaged (locked) position (FIG. 3) retaining the lock members 32*a* and 32*b* in their closed position. Spring 40 in channel 30 biases shackle pin 20 out of the channel. When the shackle pin is placed in channel 30 and the biasing force of spring 40 is overcome, shackle pin 20 truncated cone striker end 42 meshes with striker faces 46*a*, 46*b* of locking members 32*a*, 32*b* and a further downward force applied to shackle pin 20 pivots lock members 32*a*, 32*b* inwards whereupon tabs 48*a*, 48*b* of locking members 32*a*, 32*b* seat on ledges 50*a*, 50*b* of shackle pin 20. Then, a spring drives shaft 36 through recess 52 between locking members 32*a* and 32*b*. In this position, FIG. 3, pin 36 functions to keep the locking members from rotating outward to the positions shown in FIG. 2.

Figure 4:
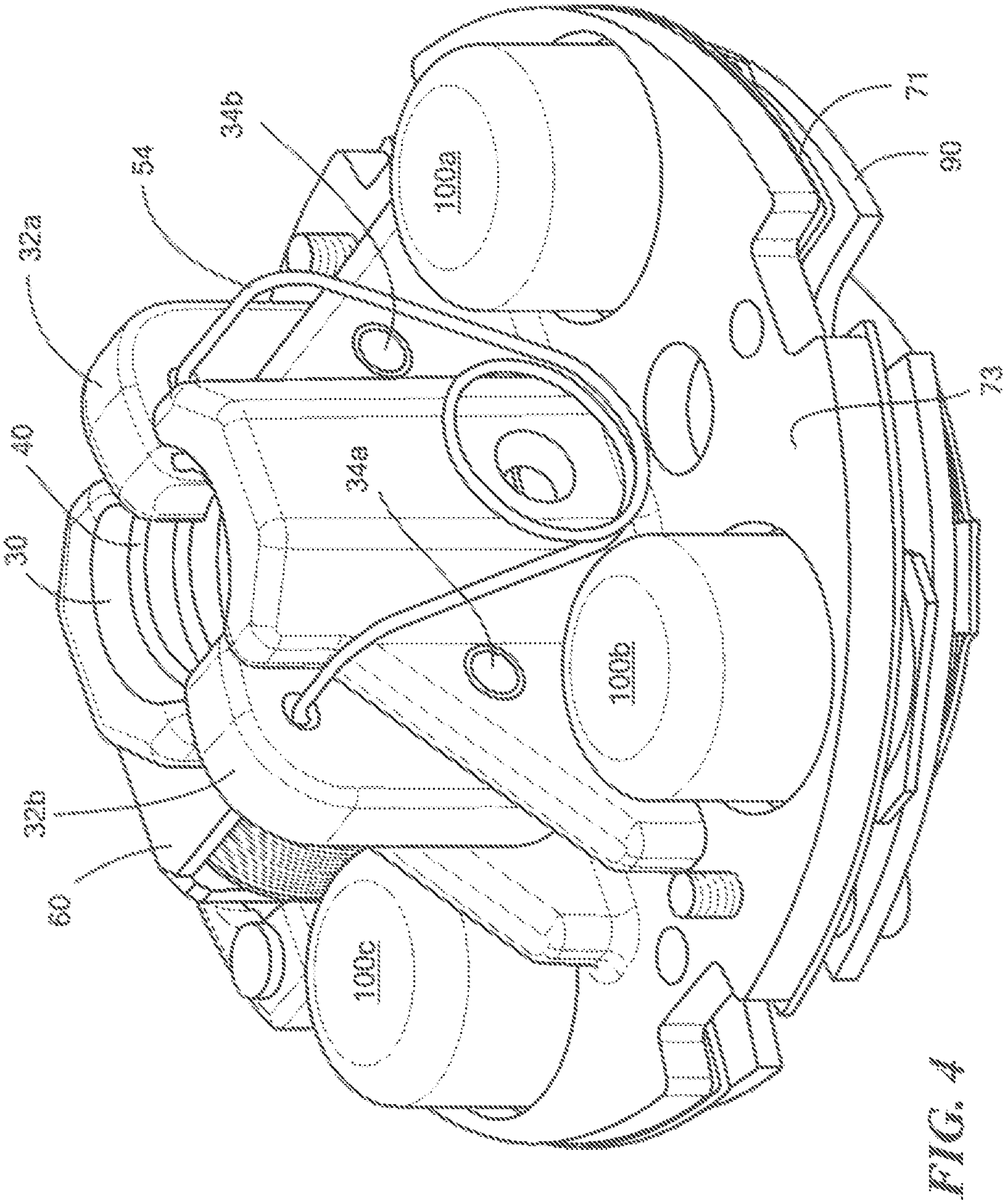
FIG. 4 is a schematic view showing a spring biasing the two locking members into an open position.

When pin 36 is retracted, spring 54, FIG. 4 connected to both lock members 32*a*, 32*b* and to structure within the lock body drives lock members 32*a*, 32*b* to their outwardly rotated position (FIG. 2) releasing shackle pin 20 from the lock body 14. Spring 40 drives the shackle pin out of channel 30. Lock members 32*a*, 32*b* have mating faces 59*a*, 59*b* which stop them from rotating outward further than shown in FIG. 2.

Figure 5:
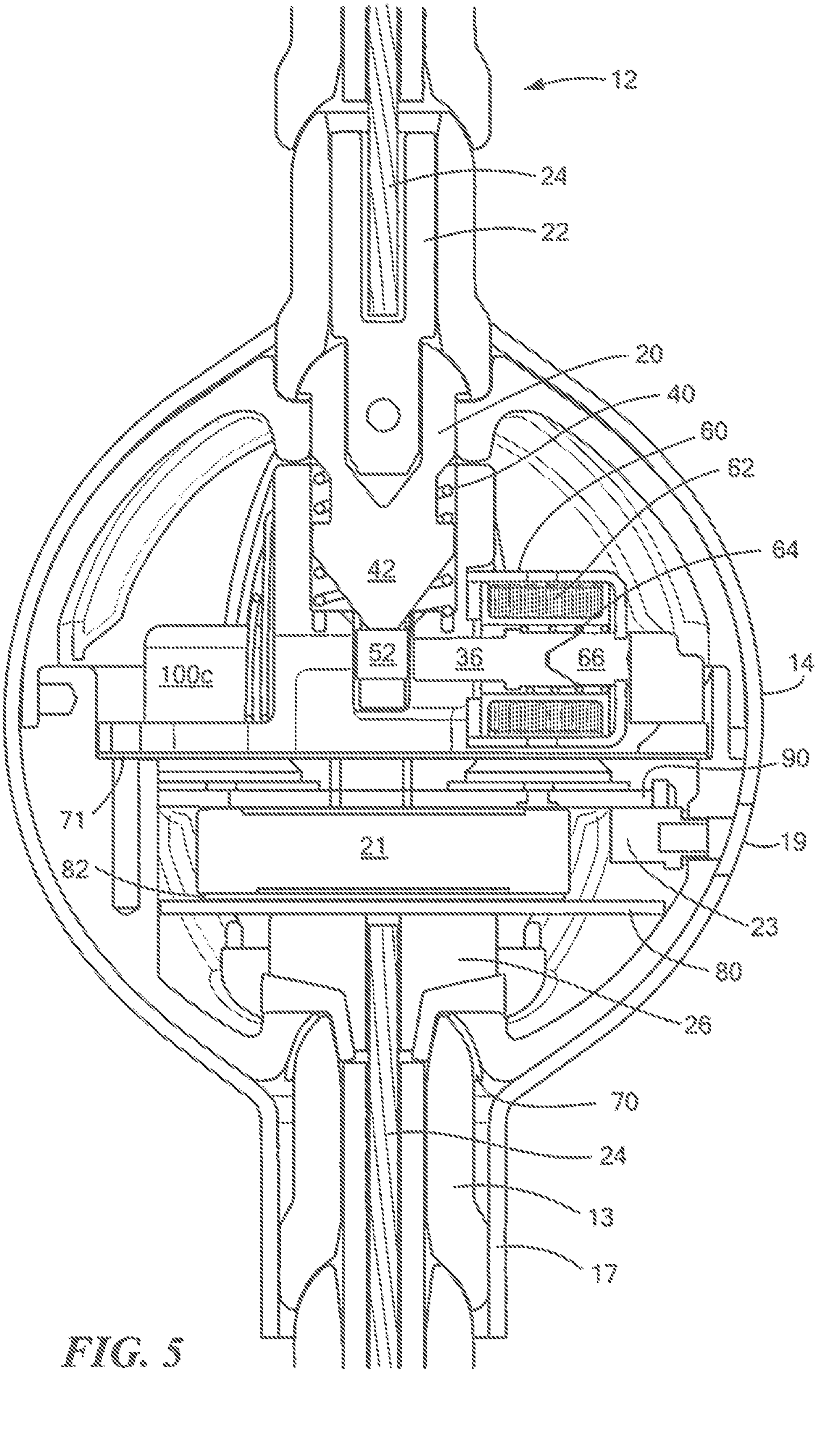
FIG. 5 is another cross-sectional view showing the lock in its unlocked position.
Figure 6:
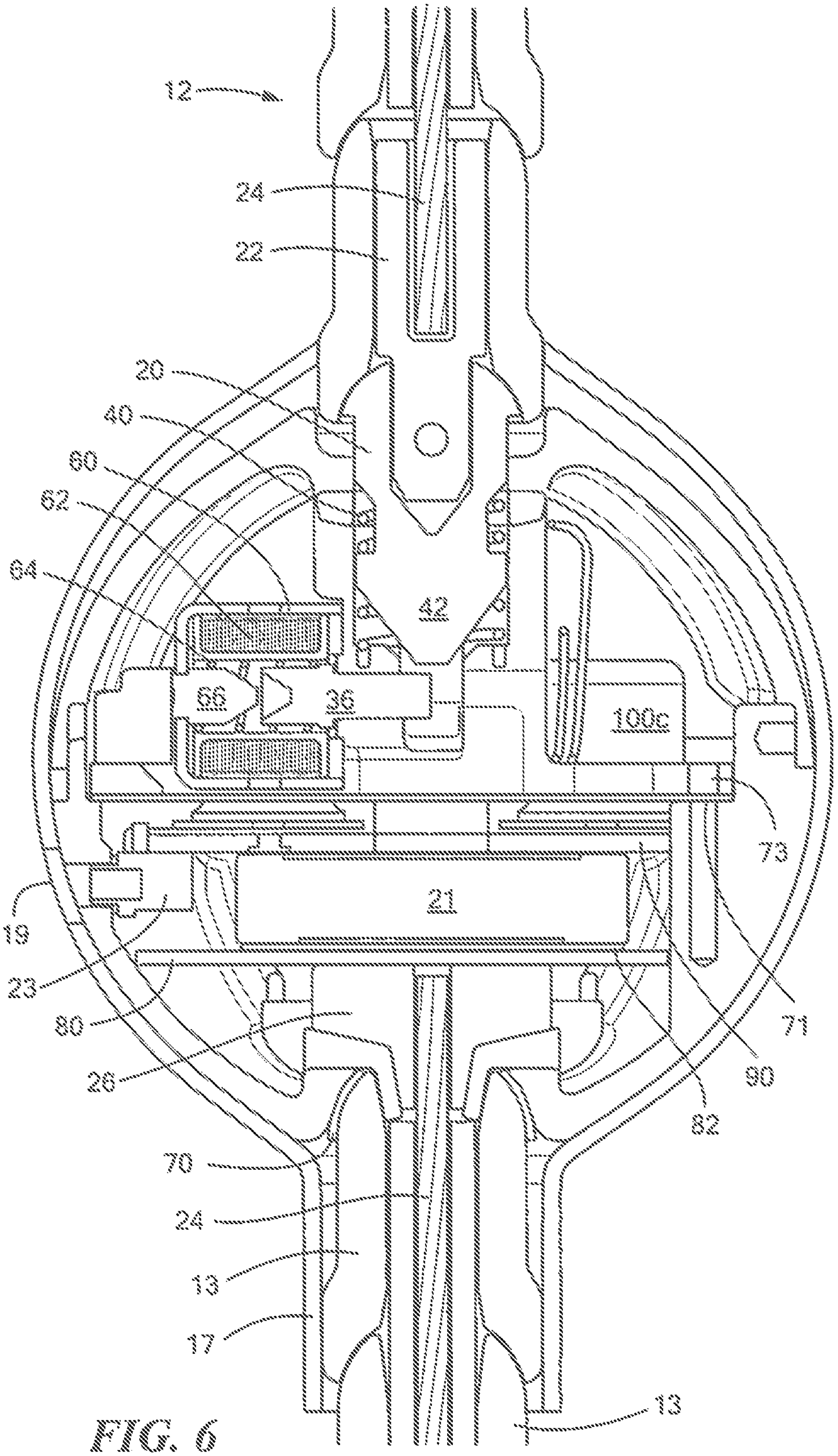
FIG. 6 is a cross-sectional view showing the lock in its locked configuration.
Figure 7:
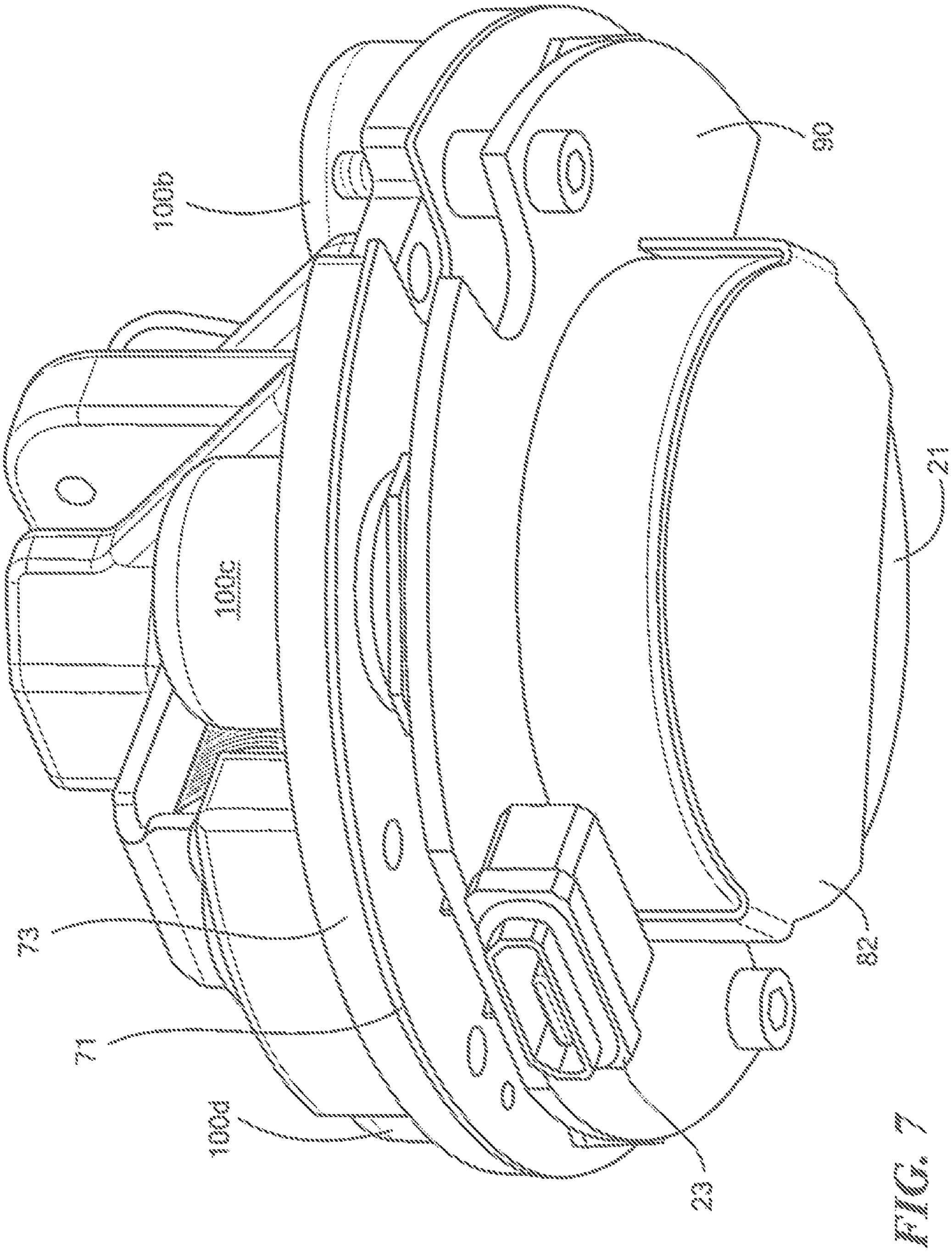
FIG. 7 is a schematic view showing the carrier assembly within the lock body.
Figure 8:
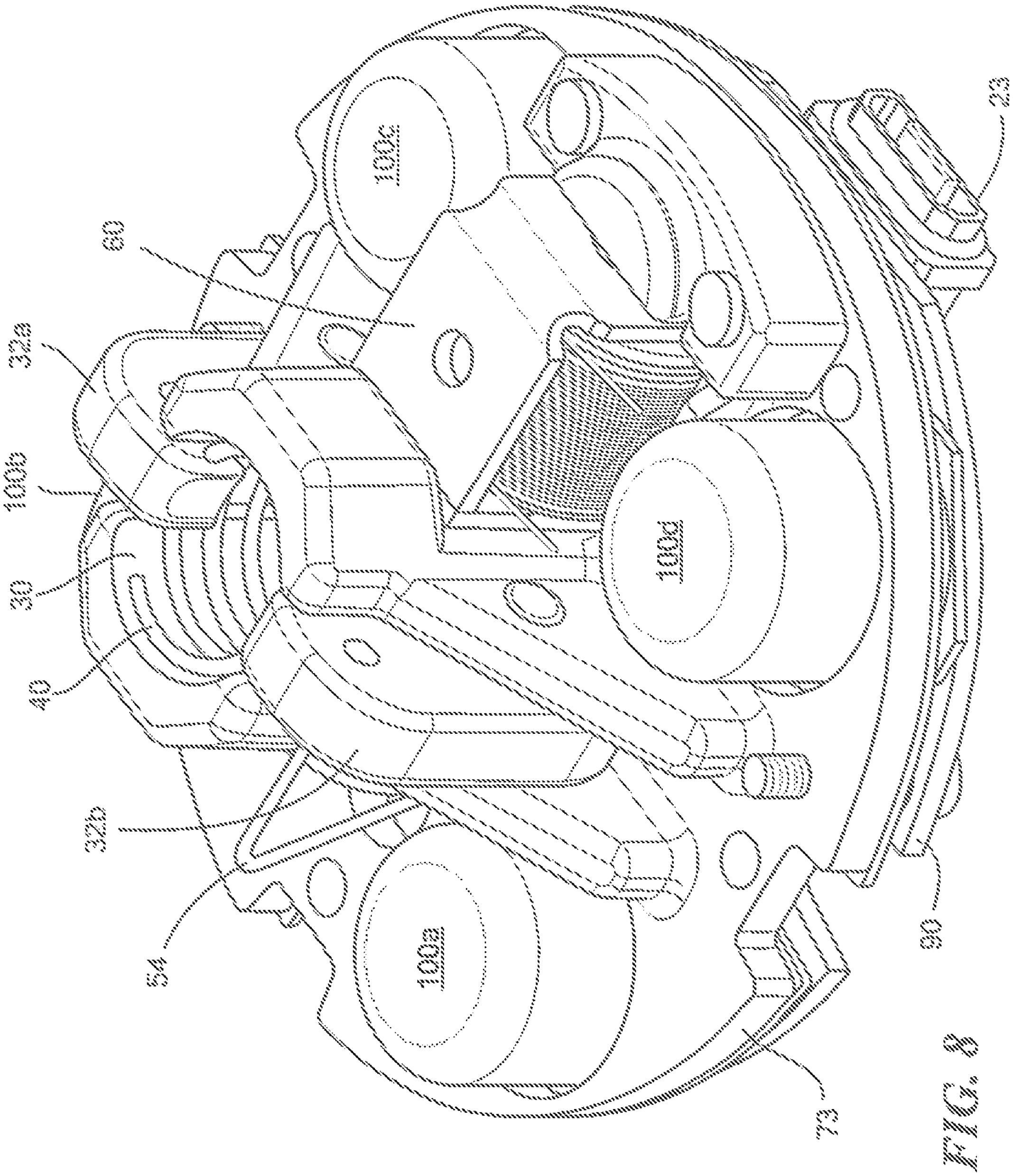
FIGS. 8-10 are additional schematic views of the carrier assembly.
Figure 9:
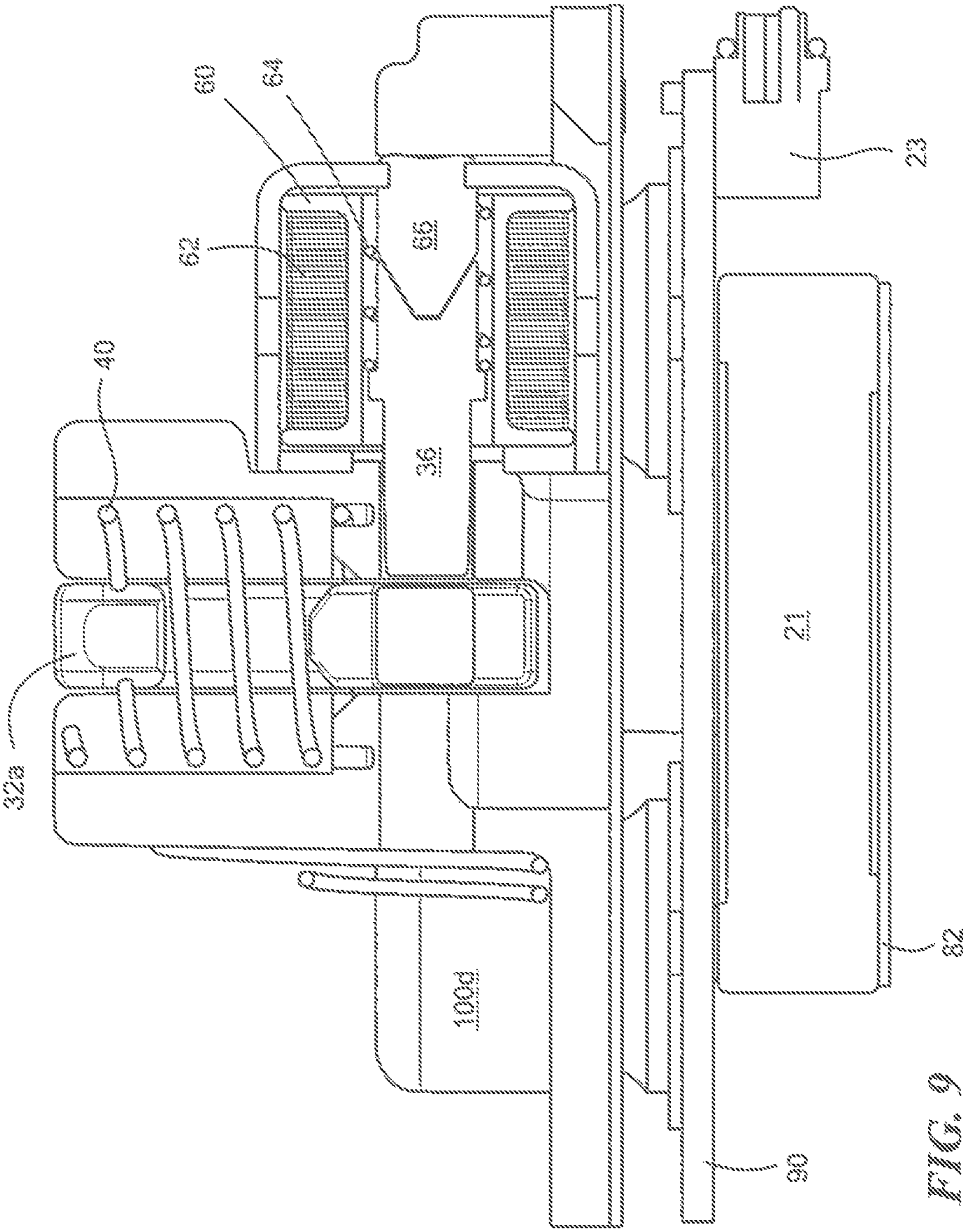
Figure 10:
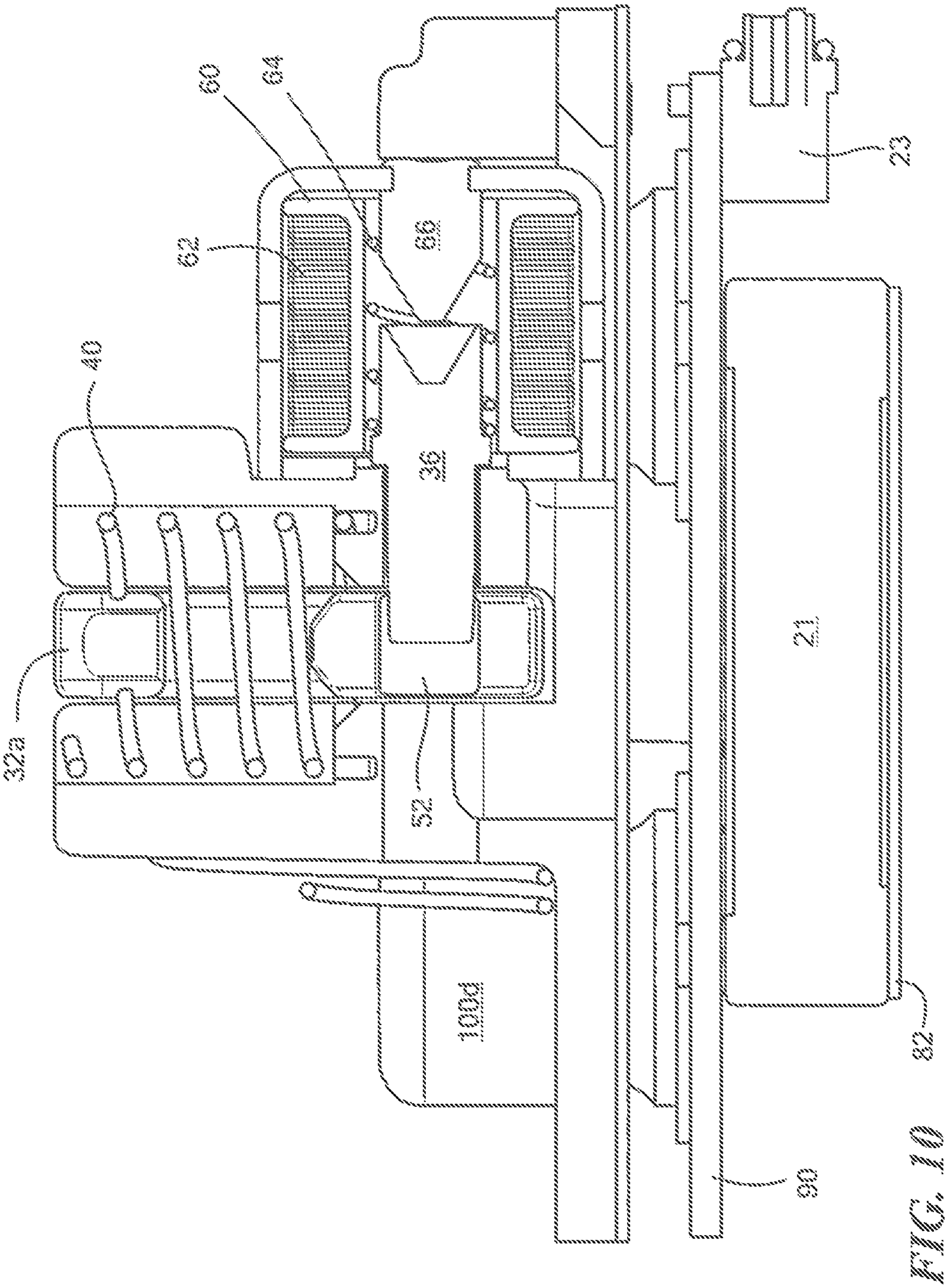

Preferably, an electrically driven linear actuator such as solenoid 60, FIG. 5 within lock body 14 includes windings 62 about pin 36, spring 64 configured to urge pin 36 to the left in the Figure, and seat 66 for pin 36. When windings 62 are energized, pin 36 retracts out of recess 52 as shown in FIG. 5 and seats on seat 66 whereupon the locking members 32*a*, 32*b* rotate outwards due to spring 54, FIG. 4 releasing the shackle pin. Spring 40 urges shackle 20 out of the lock body. As shown in FIG. 2, recess 52 is not aligned with pin 36 when the lock members are rotated outward but is aligned with the pin when the lock members are rotated inward. Windings 62 are then deenergized whereupon spring 64 urges pin 36 to the left in FIG. 5 so it is ready to automatically enter the recess between the two locking members when they are rotated to their closed position by the action of inserting the shackle pin into the lock body channel. FIG. 6 shows the position of pin 36 in the locked position.

In this way, solenoid windings 62 need only be energized a very short time in order to unlock the lock saving battery power. Locking the lock requires no battery power and instead occurs by the mechanical action of the shackle pin being driven into the lock body, the action of the locking members being moved to their closed position via the insertion of the shackle pin into the locked body, and the action of the solenoid pin biased to engage to the locking members to retain them in their closed position.

Plastic membrane 70 between cable end 26 FIGS. 2-3 and lock body lower housing portions 72*b* serves to keep dust and water out of the lock body. The same is true for plastic membrane 71.

In one version, an antenna for the Bluetooth receiver or transceiver is realized using one or more extra pins of the Bluetooth charging port connected to printed circuit board 90 which includes the receiver and the appropriate logic circuitry. But, in one preferred embodiment shown, the antenna includes conductive wire rope 24, FIG. 1C, conductive beads 13, and insulative shielding 15. In this way, the antenna for the Bluetooth receiver or transceiver includes the cable itself. Conductive metal lock body housing sections 72*a* and 72*b* serve as the antenna ground. Cable end 26 is also conductive. Thin plastic disc 80 between conductive battery holder 82 and cable end 26 serves as shielding. The rf signal for the smart device proceeds via the cable to cable end 26, through the plastic disc 80, to the conductive battery holder 82 located in very close proximity to the cable end 26, and then to the printed circuit board 90 which includes the receiver or transceiver and logic circuitry (e.g., one or more processors, microcontrollers, application specific integrated circuits, or the like configured via programming associated therewith) is configured to interpret the rf signal and initiate the appropriate actions such as proving a short (e.g. 200 millisecond or less) voltage pulse to the solenoid to unlock the lock.

FIGS. 7-10 show additional details of the carrier within the lock body housing including capacitors 100*a*-100*d* on printed circuit board 90 which energize the solenoid. Dust/water shield 71 is located between capacitor holder 73 and printed circuit board 90.

Figure 11:
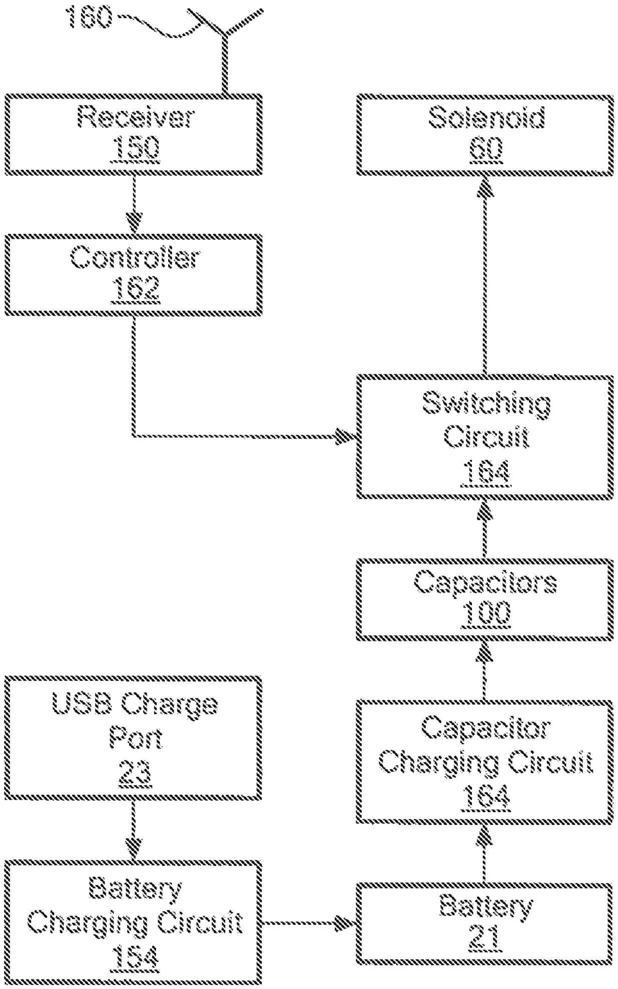
FIG. 11 is a block diagram showing the primary components associated with the electronic subsystem(s) of a preferred version of the lock.

FIG. 11 depicts the primary electronic components associated with one preferred lock. There is a charging port (e.g., a mini USB charging port) for charging battery 21 via battery charging circuit 154. Wireless battery charging is also possible. Mechanical motion (e.g. piezoelectric) charging is also possible. Battery 21, in turn, charges the one or more capacitors 100 via charging circuit 156.

A receiver coupled to antenna 160 (or a transceiver for two-way communications) receives, typically via the Bluetooth standard, a communication from a smart device (e.g., a cell phone with the appropriate application loaded thereon) a signal to unlock the lock. Controller 162 receives and processes this signal and activates switching circuitry 164 which allows the capacitors 100 to discharge their power to solenoid 60. A short high voltage pulse is all that is required. The windings of the solenoid then drive the shaft out of engagement with the locking members as described previously and the lock is unlocked. One preferred antenna structure is also previously described.

Bi-directional communications may be useful for authentication, battery power indications, unlock and lock times and date data, GPS location data, and the like.

Although specific features of the invention are shown in some drawings and not in others, this is for convenience only as each feature may be combined with any or all of the other features in accordance with the invention. For example, the lock described here can be used as lock for lockers, doors, and the like. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A lock comprising:
- a cable with one or more conductors configured as an antenna;
- a shackle pin connected to one end of the cable; and
- a lock body connected to another end of the cable and including:
  - a conductive housing section serving as a ground for the antenna,
  - a channel for the shackle pin,
  - at least one lock member adjacent the channel and biased to an open position disengaged from the shackle pin and driven by the shackle pin to a closed position engaging the shackle pin,
  - a retainer associated with said lock member and driven to a released position disengaged from said lock member and biased to an engaged position retaining said lock member in its closed position,
  - an electrically driven linear actuator driving the retainer to its released position in response to a signal received by a receiver via the antenna, and
  - an antenna shield between the cable and the receiver.

2. The lock of claim 1 in which the lock body further includes one or more capacitors for powering the electrically driven linear actuator and charged by a battery.

3. The lock of claim 2 further including a charging circuit for the battery.

4. The lock of claim 1 in which the actuator is spring biased to the engaged position with said lock member.

5. The lock of claim 1 in which the lock is spring biased to the open position.

6. The lock of claim 1 in which the shackle pin is spring biased outwards from the channel.

7. The lock of claim 1 in which the lock member includes a striker face which engages the shackle pin to pivot the lock member to the closed position.

8. The lock of claim 1 in which the shackle pin includes a ledge and the lock member includes a tab seated on the ledge when the lock member is in the closed position.

9. The lock of claim 1 in which the retainer is a shaft and the lock member includes a recess receiving the shaft therein when the shaft engages the lock member in its closed position.

10. The lock of claim 9 in which the recess is aligned with the shaft when the lock member is in the closed position and the recess is not aligned with the shaft when the lock member is in the open position.

11. The lock of claim 1 in which a majority of the lock body includes curved surfaces.

12. The lock of claim 1 in which the cable includes a wire rope surrounded by a sheath, the sheath surrounded by interlocking metal beads.

13. The lock of claim 1 in which the cable conductors include a conductive wire rope surrounded by conductive beads and a conductive cable end.

14. The lock of claim 13 in which the receiver is located on a printed circuit board adjacent the shield, the shield located between the printed circuit board and the conductive cable end.

15. The lock of claim 14 in which the printed circuit board is grounded to the conductive housing section.

16. A lock comprising:
- a cable with one or more conductors configured as an antenna;
- a shackle pin connected to one end of the cable; and
- a lock body connected to another end of the cable and including:
  - a conductive housing section serving as a ground for the antenna,
  - a channel for the shackle pin,
  - means for retaining the shackle pin in the channel,
  - an electronically driven linear actuator driving the means for retaining the shackle pin to a released position in response to a signal received by a receiver via the cable, and
  - an antenna shield between the cable and the receiver.

17. The lock of claim 16 further including one or more capacitors for powering the linear actuator and charged via a battery.

18. The lock of claim 17 further including a charging circuit for the battery.

19. The lock of claim 16 in which the means for retaining includes:

at least one lock member adjacent the channel pivotable from an open position disengaged from the shackle pin to a closed position engaging the shackle pin, and a retainer associated with a lock member driven from a released position disengaged from the lock member to an engaged position retaining the lock member in the closed position.

20. The lock of claim 19 in which the the retainer is spring biased to the engaged position.

21. The lock of claim 19 in which the lock member is spring biased to the open position.

22. The lock of claim 19 in which the shackle pin is spring biased outwards from the channel.

23. The lock of claim 19 in which the lock member includes a striker face which engages the shackle pin to pivot the lock member to the closed position.

24. The lock of claim 19 in which the shackle pin includes a ledge and the lock member includes a tab seated on the ledge when the lock member is in the closed position.

25. The lock of claim 19 in which the retainer is a shaft and the lock member includes a recess receiving the shaft therein when the shaft engages the lock member in its closed position.

26. The lock of claim 25 in which the recess is aligned with the shaft when the lock member is in the closed position and the recess is not aligned with the shaft when the lock member is in the open position outwards from the channel.

27. The lock of claim 16 in which a majority of the lock body includes curved surfaces.

28. The lock of claim 16 in which the cable includes a wire rope surrounded by a sheath, the sheath surrounded by interlocking metal beads.

29. The lock of claim 16 in which the cable conductors include a conductive wire rope surrounded by conductive beads and a conductive cable end.

30. The lock of claim 29 in which the receiver is located on a printed circuit board adjacent the shield, the shield located between the printed circuit board and the conductive cable end.

31. The lock of claim 30 in which the printed circuit board is grounded to the conductive housing section.

* * * * *